US006692861B2

United States Patent
Tao (10) Patent No.: US 6,692,861 B2
(45) Date of Patent: Feb. 17, 2004

(54) CARBON-OXYGEN FUEL CELL

(75) Inventor: Tao T. Tao, North Attleboro, MA (US)

(73) Assignee: CellTech Power, Inc., Westborough, MA (US)

( * ) Notice: Subject to any disclaimer, the term of this patent is extended or adjusted under 35 U.S.C. 154(b) by 0 days.

(21) Appl. No.: 09/819,886

(22) Filed: Mar. 28, 2001

(65) Prior Publication Data

US 2002/0015877 A1 Feb. 7, 2002

Related U.S. Application Data

(63) Continuation of application No. 09/033,923, filed on Mar. 3, 1998, now abandoned.

(51) Int. Cl.[7] .............................. H01M 4/86; H01M 4/00
(52) U.S. Cl. .......................................... 429/44; 429/29
(58) Field of Search .............................. 429/26, 40, 44, 429/29, 30, 31

(56) References Cited

U.S. PATENT DOCUMENTS

| | | | |
|---|---|---|---|
| 460,122 A | 9/1891 | Edison | |
| 3,138,490 A | 6/1964 | Tragert et al. | |
| 3,432,352 A | 3/1969 | White et al. | |
| 3,970,474 A | 7/1976 | Anbar et al. | |
| 4,042,755 A | 8/1977 | Anbar | |
| 4,170,534 A | 10/1979 | Fitterer | |
| 4,670,702 A | 6/1987 | Yamada et al. | |
| 4,883,724 A | 11/1989 | Yamamoto | |
| 5,045,170 A | 9/1991 | Bullock et al. | |
| 5,298,340 A | 3/1994 | Cocks et al. | |
| 5,316,870 A | 5/1994 | Ohga | |
| 5,348,812 A | 9/1994 | Cocks et al. | |
| 5,376,469 A | * 12/1994 | Gür et al. ................... | 429/17 |
| 5,523,177 A | 6/1996 | Kosek et al. | |
| 5,558,947 A | 9/1996 | Robison | |
| 5,567,540 A | 10/1996 | Stone et al. | |
| 5,589,287 A | 12/1996 | Hatoh et al. | |
| 5,589,289 A | 12/1996 | Zhang et al. | |
| 5,591,537 A | 1/1997 | Bagger et al. | |
| 5,595,832 A | 1/1997 | Tomimatsu et al. | |
| 5,604,048 A | 2/1997 | Nishihara et al. | |
| 5,637,414 A | 6/1997 | Inoue et al. | |
| 5,750,278 A | 5/1998 | Gillett et al. | |
| 5,766,786 A | 6/1998 | Fleck et al. | |
| 5,985,474 A | 11/1999 | Chen et al. | |
| 6,096,449 A | 8/2000 | Fuglevand et al. | |
| 6,127,057 A | 10/2000 | Gorman | |
| 6,200,697 B1 | * 3/2001 | Pesavento ................... | 429/28 |
| 6,242,120 B1 | 6/2001 | Herron | |
| 6,265,093 B1 | 7/2001 | Surampudi et al. | |
| 6,379,485 B1 | 4/2002 | Borglum | |

FOREIGN PATENT DOCUMENTS

| | | |
|---|---|---|
| DE | 367151 | 1/1923 |
| DE | 2650960 A1 | 5/1977 |
| DE | 4004220 C1 | 4/1991 |

(List continued on next page.)

OTHER PUBLICATIONS

R.A. Alberty, Physical Chemistry, 6th Edition, John Wiley & Sons publisher, 1983, pp. 228–229 (chapter 6.11) No Month.
Weaver et al., "Direct use of coal in a fuel cell: feasibility investigation", Chemical Abstracts, Abstract No. 180031, vol. 85, No. 24, 1976 (no month).

(List continued on next page.)

*Primary Examiner*—Donald R. Valentine
(74) *Attorney, Agent, or Firm*—Wolf Greenfield & Sacks, P.C.

(57) ABSTRACT

The present invention relates to a fuel cell that use carbon and oxygen as fuel sources. In particular, the fuel cell comprises a carbon-containing anode, an electrolyte and a solid state cathode. Heating the fuel cell to temperatures of 400° C.–2000° C. provides an electrical output of at least 1 mW·cm$^{-2}$. The present invention also discloses a method for generating electricity with a fuel cell comprising a carbon-containing anode, an electrolyte and a solid state cathode.

71 Claims, 3 Drawing Sheets

FOREIGN PATENT DOCUMENTS

| | | |
|---|---|---|
| EP | 0 333 261 A2 | 9/1989 |
| FR | 2020742 A | 7/1970 |
| FR | 2207365 A | 6/1974 |
| GB | 126766 | 6/1919 |
| GB | 940900 | 6/1963 |
| GB | 1276260 A | 6/1972 |
| GB | 2278010 A | 11/1994 |
| WO | WO 03/001617 A2 | 1/2003 |

OTHER PUBLICATIONS

Yentekakis et al., "A Novel Fused Metal Anode Solid Electrolyte Fuel Cell for Direct Coal Gasification: A Steady–State Model", Ind. Eng. Chem. Res., vol. 28, No. 9, pp. 1414–1424, 1989, (No Month).

Gür & Huggins, "Direct Electrochemical Conversion of Carbon to Electrical Energy in a High Temperature Fuel Cell", Journal of the Electrochemical Society, vol. 139, No. 10, pp. L95–L97, Oct. 1992.

Grant Abstract, "Novel Carbon Ion Fuel Cells," Project ID P/METC–DE–FG22–93PC93219, Duke University, Start date Sep. 23, 1993.

Grant Abstract, "Novel Carbon Ion Fuel Cells," Project ID P/PETC–FG22–93PC93219, Duke University, Start date Sep. 23, 1993.

* cited by examiner

FIGURE 6 ically available fuel cells use
hydrogen and oxygen as fuel gases. Disadvantages of the
current systems include the lack of a readily available
hydrogen source, the bulky apparatus needed to contain
hydrogen and the need for safety precautions for storing an
explosive gas such as hydrogen. Such disadvantages can
lead to increased costs and can preclude or make difficult the
the development of some compact, portable and mobile
applications.

CARBON-OXYGEN FUEL CELL

RELATED APPLICATIONS

This application is a continuation of U.S. application Ser. No. 09/033,923, filed Mar. 3, 1998, entitled A Carbon-Oxygen Fuel Cell, and now abandoned.

FIELD OF THE INVENTION

The present invention relates to a fuel cell that use carbon and oxygen as fuel sources. In particular, the fuel cell comprises a carbon-containing anode, an electrolyte and a solid state cathode. Heating the fuel cell to temperatures of 400° C.–2000° C. generates an electrical output of at least 1 mW·cm$^{-2}$. The present invention also discloses a method for generating electricity with a fuel cell comprising a carbon-containing anode, an electrolyte and a solid state cathode.

BACKGROUND OF THE INVENTION

The most common commercially available fuel cells use hydrogen and oxygen as fuel gases. Disadvantages of the current systems include the lack of a readily available hydrogen source, the bulky apparatus needed to contain hydrogen and the need for safety precautions for storing an explosive gas such as hydrogen. Such disadvantages can lead to increased costs and can preclude or make difficult the the development of some compact, portable and mobile applications.

Using carbon as a fuel source presents some unique characteristics over current metal/air, dry cell and wet cell batteries. The ratios of valence number to molecular weight, 4:12 and 2:12, are low, providing a potential of producing more electrons per unit atomic weight. Hydrogen is the only element that is more efficient than carbon. Unlike hydrogen, conductive carbon sources, such as coal, are abundant and relatively inexpensive. Carbon materials can be fashioned in any desired shape which allows a compact design for mobile applications. Finally, carbon presents a very low number of safety hazards. Carbon, however is chemically inert under moderate conditions and must be heated to temperatures of at least 400° C. to overcome the activationz energy in a reaction with oxygen. For example, coal and graphite react with air rapidly at 750° C. and 850° C. respectively.

Patents which disclose the use of carbon as an anode include U.S. Pat. No. 460,122 and U.S. Pat. No. 5,589,289. It is believed that none of the fuel cells described in these patents have had widespread commercial success. U.S. Pat. No. 460,122 relates to a process for generating electricity by heating carbon or carbonaceous materials to high temperatures in the presence of an active agent such as a metal oxide or a salt. The carbon and active agent is contained in metal pot which also functions as a cathode. The patent suggests that heating the pot results in a reaction between the oxide and carbon to form carbon monoxide and a resulting electrical current. U.S. Pat. No. 5,589,289 relates to a process for synthesizing a carbon anode. An aromatic organic monomer is subjected to condensation and reduction reactions at high temperatures to yield an amorphous carbon material that displays charge and discharge characteristics. The carbon anode has applications for a rechargeable electrochemical cell.

There remains a need to develop more energy efficient fuel cells that provide a greater electrical output over the commercially available products, allow a more compact design for greater mobility, are easy to construct and are safe to use. Accordingly, an object of the present invention is the provision of a fuel cell that employs a carbon anode as a fuel source and operates with a solid state cathode for use at temperatures between 400° C. and 2000° C. A method and apparatus for generating electricity with a fuel cell apparatus are also disclosed.

SUMMARY OF THE INVENTION

The present invention relates to a fuel cell with carbon and oxygen fuel sources for generating electricity and a method for generating electricity with a carbon-oxygen fuel cell.

One aspect of the invention provides a fuel cell for generating electricity using carbon and oxygen as fuel sources. The fuel cell comprises a carbon-containing anode, an electrolyte in contact with the anode at a first contact surface area and a solid state cathode in contact with the electrolyte at a second contact surface area. The cathode reduces oxygen, $O_2$, to oxygen anions, $O^{2-}$, and the electrolyte allows passage of oxygen anions to the anode. The fuel cell is operable at a temperature of between 400° C. and 2000° C. and generates an electrical output of at least 1 mW·cm$^{-2}$ of the second contact surface area.

The carbon-containing anode used preferably has a resistivity of between about $10^{-5}$ ohm-cm to about 100 ohm-cm. The anode is solid or in particle form and is preferably selected from the group consisting of graphite, quasi-graphite, coal, coke, charcoal, fullerene, buckminsterfullerene, carbon black, activated carbon, decolorizing carbon and mixtures thereof.

The invention preferably provides a solid state electrolyte having a distance therethru from a first contact surface area adjacent to an anode to a second contact surface area adjacent to a cathode of between about 1 µm and 1000 µm, preferably between about 1 µm and 600 µm and more preferably between about 1 µm and 100 µm. Where the electrolyte is a solid layer, the distance is preferably between about 1 µm and about 1000 µm, preferably between about 1 µm and 600 µm and more preferably between about 1 µm and 100 µm. The electrolyte most preferably has a formula $(ZrO_2)(HfO_2)_a(TiO_2)_b(Al_2O_3)_c(Y_2O_3)_d(M_xO_y)_e$ where a is from 0 to about 0.2, b is from 0 to about 0.5, c is from 0 to about 0.5, d is from 0 to about 0.5, x is an integer greater than 0 and less than or equal to 2, y is an integer greater than 0 and less than or equal to 3, e is from 0 to about 0.15, and M is selected from the group consisting of manganese, iron, cobalt, nickel, copper and zinc.

The electrolyte preferably has a melting temperature of between about 300° C. and about 2000° C. The electrolyte can be selected from the group consisting of a metal carbonate, a metal oxide, a plurality of metal carbonates, a plurality of metal oxides and mixtures thereof.

The solid state cathode of this invention preferably has an oxygen ionization rate of between about $10^{-8}$ g·s$^{-1}$·cm$^{-2}$ and about $10^{-3}$ g·s$^{-1}$·cm$^{-2}$. The cathode also has an electrical resistivity of between about $10^{-9}$ ohm-cm to about 100 ohm-cm. The cathode is preferably selected from the group consisting of a metal, a metal oxide, a plurality of metal oxides and mixtures thereof. The solid state cathode preferably has a formula $La_xMn_yA_aB_bC_cO_d$ where A is an alkaline earth metal, B is selected from the group consisting of scandium, yttrium and a lanthanide metal, C is selected from the group consisting of titanium, vanadium, chromium, iron, cobalt, nickel, copper, zinc, zirconium, hafnium, aluminum and antimony, x is from 0 to about 1.05, y is from 0 to about 1, a is from 0 to about 0.5, b is from 0 to about 0.5, c is from 0 to about 0.5 and d is between about 1 and about 5 so that an oxide is always present, and at least one of x, y, a, b and c is greater than zero. The solid state cathode may also have a formula $Li_xM_{1-x}O$ where M is a metal selected from the group consisting of nickel and cobalt and x is from 0 to about 0.25.

In another aspect of the invention, a method is provided for generating electricity in a fuel cell having a carbon-containing anode. The method comprises the steps of providing a carbon-containing anode, an electrolyte in contact with the carbon-containing anode at a first contact surface area and a solid state cathode in contact with the electrolyte at a second contact surface area. An oxygen-containing gas flow is directed to the cathode and the fuel cell is heated to a temperature of between about 400° C. and about 2000° C. to produce an electrical output of at least about $1\ mW \cdot cm^{-2}$ of the second contact surface area.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
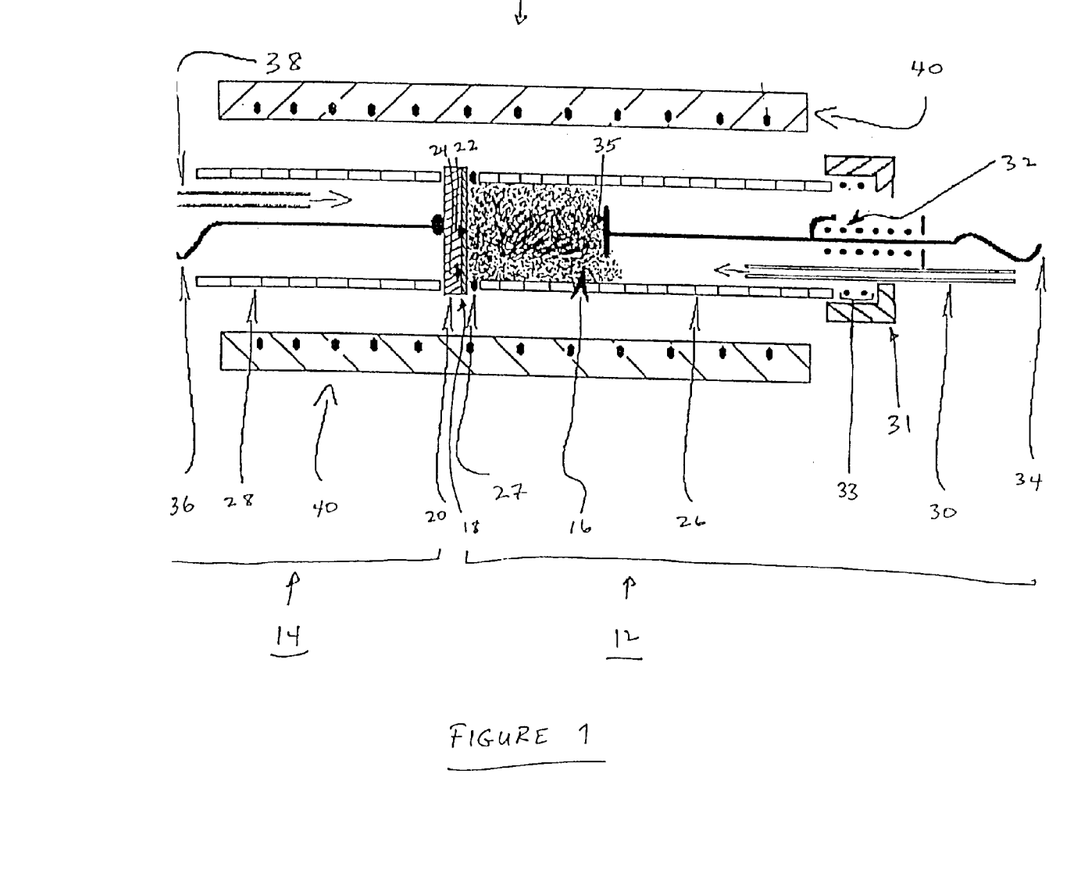
FIG. 1 shows a semidiagramatic, cross-sectional view of an embodiment of a fuel cell having a solid state electrolyte.

FIG. 1 shows a semidiagramatic, cross-sectional view of an embodiment of a fuel cell 10. Fuel cell 10 comprises an anodic section 12 and a cathodic section 14. An electrolyte 18 contacts both the anodic section 12 and the cathodic section 14. Referring to FIG. 1, the anodic section 12 contains a carbon-containing anode 16 at one end, springs 32 and 33, a metal wire lead 34 connected to spring 32 and an inert gas flow from a gas pipe 30, and the anode 16, coil springs 32 and 33 and inert gas flow from gas pipe 30 are enclosed within a cylindrical anodic casing 26 and a cap 31. The cathodic section 14 contains a cylindrical planar disk cathode 20 at one end, a metal wire lead 36 connected to the cathode 20 and an oxygen-containing gas flow from gas pipe 38 directed towards the cathode 20, and cathode 20, metal wire lead 36 and oxygen-containing gas flow pipe 38 are enclosed within a cylindrical cathodic casing 28.

The anodic casing 26 shown in FIG. 1 is cylindrical having a longitudinal axis and a circular base. The base, however can have any closed shape such as a square, rectangular or oval. The anode 16 lies at one end of the anodic casing 26 and the anodic casing 26 is structured for positioning the anode 16 in contact with the electrolyte 18 at a first contact surface area 22. Preferably the anodic casing 26 has a similar base shape and base dimension to facilitate connection of the anodic section 12 with the electrolyte through gold gaskets 27. The material for the anodic casing 26 is preferably alumina although other cylindrical inert temperature-resistant materials can be used.

The carbon-containing anode 16 can be a solid or in particulate form. When the anode 16 is in particulate form, a casing also serves to compact the particulate matter against the electrolyte 18 at the first contact surface area 22, increasing the first contact surface area 22. Accordingly, fuel cell power output increases with an increase in the first contact surface area 22 between anode 16 and electrolyte 18. This increase in first contact surface area 22 may be aided with a mechanical device. As shown in FIG. 1, anodic section 12 also includes the mechanical device in the form of a spring 32. Spring 32 is situated within the anodic casing 26 and is aligned parallel to the longitudinal axis. At one end of spring 32 is a flat surface 35 perpendicular to the longitudinal axis which contacts the particulate anode 16. Preferably the spring 32 has a force constant of at least 1 psi. A metal wire lead 34 may be connected to spring 32. In this case, spring 32 preferably has a resistivity at least equal to that of the anode. When the anode is a solid, the metal wire lead 34 may be connected to the anode directly. Cap 31 is held in a fixed position, and another spring 33, positioned under cap 31, keeps a tight seal around the gold gasket 27, the casing 26, which also has a fixed position, and the electrolyte 18.

The carbon-containing anode 16 is a conductive carbon having a resistivity of from about $10^{-5}$ ohm-cm to about 100 ohm-cm; preferably the resistivity is from about $10^{-3}$ ohm-cm to about $10^{-1}$ ohm-cm. The carbon-containing anode may be selected from the group consisting of graphite, quasi-graphite, coal, coke, charcoal, fullerene, buckminsterfullerene, carbon black, activated carbon, decolorizing carbon, and mixtures thereof. Quasi-graphite is a particulate carbon in which the carbon—carbon bonds, having lengths ranging from 1.33 Å to 1.40 Å, are slightly longer than carbon—carbon bonds in graphite which have a length of 1.32 Å. Carbon black includes several forms of artificially prepared carbon or charcoal. Examples include animal charcoal obtained by charring bones, meat and blood; gas black, furnace black, channel black and conductive black, obtained by incomplete combustion of natural gas, acetylene gas, oils and other hydrocarbons; lamp black obtained by burning various fats, oils and resins, and activated charcoal such as CarbomixPenn, Carboraffin, MedicoalLundbeck, and Norit, prepared from wood and other natural biomass; and glassy carbon. One particular example is electrically conductive carbon black, obtained as Black Pearl manufactured by Cabot Corp., Boston, Mass.

Also included within the anodic section 12 is an inert gas provided through a gas pipe 30 which functions to isolate the anode from the environment. Because the fuel cell 10 is designed to operate at a temperature of at least 400° C., exposing a hot, carbon surface to air in the environment may result in oxidation of the anode, which consequently wastes fuel. In FIG. 1, the inert gas flow pipe 30 is directed towards the anode and the inert gas may be selected from the group consisting of nitrogen, helium, argon, neon, krypton, exhaust gases formed during operation of the fuel cell such as carbon dioxide and carbon monoxide, and mixtures thereof.

The cathodic casing 28 shown in FIG. 1 is cylindrical having a longitudinal axis and a circular base. The base, however can have any closed shape such as a square, rectangular or oval. Cathodic casing 28 is structured for positioning the cathode 20 in contact with the electrolyte 18 at a second contact surface area 24. Preferably the cathodic casing 28 has a similar base shape and base dimension to facilitate connection of the cathodic section 14 with the electrolyte 18 through gold gaskets 27. The material for the cathodic casing 28 is preferably alumina although other cylindrical inert temperature-resistant materials can be used.

Figure 2:
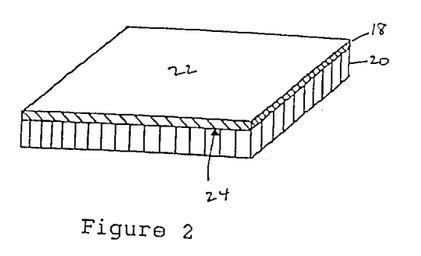
FIG. 2 shows a top, front perspective view of an embodiment of a solid state electrolyte and a solid state cathode in a flat or planar arrangement.
Figure 3:
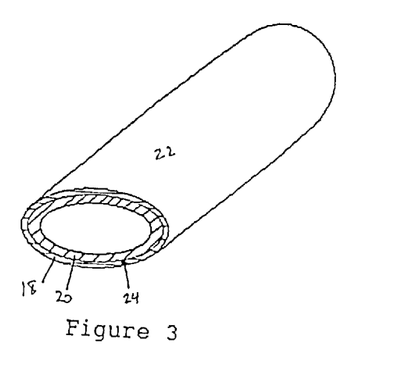
FIG. 3 shows a top, front perspective view of an embodiment of a solid state electrolyte and a solid state cathode in a tubular arrangement.

It is known that fuel cell power output increases with an increase in the second contact surface area 24 which can be optimized when a substantially planar cathode 20 contacts a substantially planar electrolyte 18, as shown in FIG. 1. When both the electrolyte 18 and cathode 20 are layers, they can either have a flat or planar arrangement as shown in FIG. 2 or a tubular arrangement as shown in FIG. 3. The cathode has a thickness from the contact area with the electrolyte on one side of the cathode to a second side of the cathode exposed to oxygen, where the thickness is at least about 1 $\mu$m. The second contact surface area 24 increases substantially when electrolyte 18 is deposited onto the cathode 20 at the second contact surface area 24 by a method selected from the group consisting of screen-printing, painting, spraying, dipping and pressing and ion deposition. This increase in second contact surface area 24 is achieved because of the intimate contact obtained at the interface between the cathode and electrolyte (the second contact surface area) using these methods.

The cathode 20 is ionizes oxygen, $O_2$, to oxygen anions, $O^{2-}$. Preferably, the cathode 20 has an oxygen ionization rate of between about $10^{-8}$ g·s$^{-1}$·cm$^{-2}$ and about $10^{-3}$ g·s$^{-1}$·cm$^{-2}$. More preferably, the oxygen ionization rate is between about $5 \times 10^{-6}$ g·s$^{-1}$·cm$^{-2}$ and about $10^{-4}$ g·s$^{-1}$·cm$^{-2}$.

The cathode 20 is constructed of materials such that cathode 20 can withstand operating temperatures of at least 400° C. and has an electrical resistivity of between about $10^{-9}$ ohm-cm and about 100 ohm-cm. Preferably, the cathode 20 may be selected from the group consisting of a metal, a metal oxide, a plurality of metal oxides and mixtures thereof. The metal is defined as a solid at a temperature of at least 400° C. and which retains inherent conductivity when exposed to oxygen at temperatures of at least 400° C. The metal can be selected from the group consisting of platinum, palladium, gold, silver, stainless steel, copper, nickel, cobalt, titanium, vanadium, chromium, iron and zirconium. Alternatively, the solid state cathodes can be ceramic materials having a formula $La_xMn_yA_aB_bC_cO_d$ where A is an alkaline earth metal, B is selected from the group consisting of scandium, yttrium and a lanthanide metal, C is selected from the group consisting of titanium, vanadium, chromium, iron, cobalt, nickel, copper, zinc, zirconium, hafnium, aluminum and antimony. An appropriate number of oxygen anions are required to counteract the positive charge on the metal ions to result in a neutrally-charged $La_xMn_yA_aB_bC_cO_d$ species. Because a metal is always present in the formula, at least one of x, y, a, b and c is greater than zero where x is from 0 to about 1.05, y is from 0 to about 1, a is from 0 to about 0.5, b is from 0 to about 0.5, and c is from 0 to about 0.5. Oxide is always present in the formula, and d is between about 1 and about 5. Examples of solid state cathodes include $LaMnO_3$, $La_{0.84}Sr_{0.16}MnO_3$, $La_{0.84}Ca_{0.16}MnO_3$, $La_{0.84}Ba_{0.16}MnO_3$, $La_{0.65}Sr_{0.35}Mn_{0.8}Co_{0.2}O_3$, $La_{0.79}Sr_{0.16}Mn_{0.85}Co_{0.15}O_3$, $La_{0.84}Sr_{0.16}Mn_{0.8}Ni_{0.2}O_3$, $La_{0.84}Sr_{0.16}Mn_{0.8}Fe_{0.2}O_3$, $La_{0.84}Sr_{0.6}Mn_{0.8}Ce_{0.2}O_3$, $La_{0.84}Sr_{0.16}Mn_{0.8}Mg_{0.2}O_3$, $La_{0.84}Sr_{0.16}Mn_{0.8}Cr_{0.2}O_3$, $La_{0.6}Sr_{0.35}Mn_{0.8}Al_{0.2}O_3$, $La_{0.84}Sc_{0.16}MnO_3$, and $La_{0.84}Y_{0.16}MnO_3$. Cathode materials can also be a physical mixture of $La_xMn_yA_aB_bC_cO_d$ and another ceramic preferably having a formula $(ZrO_2)(HfO_2)_e(Y_2O_3)_f$ where e is from 0 to about 0.2 and f is from 0 to about 0.5. Preferably, the mixture has a ratio from 1:0 to about 1:2. For example a physical blends of $La_{0.84}Sr_{0.16}MnO_3$, with $(ZrO_2)(HfO_2)_{0.02}(Y_2O_3)_{0.08}$ can be prepared at a ratio from 1:0 to about 1:2. The physical blend is prepared by grinding the mixture with a mortar and pestle. The physical blend can also contain binding reagents such as water, polyols, polyesters and polysaccharides (starch). All the metal oxide materials that make up the cathode are preferably subjected to a sintering step at temperatures of at least 1000° C.

The solid state cathode may also have a formula $Li_xM_{1-x}O$ where M is nickel or cobalt and x is from 0 to about 0.25. The solid state cathode can also be $Cr_2O_3$.

Figure 4:
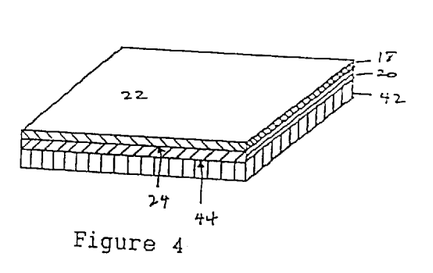
FIG. 4 shows a top, front perspective view of an embodiment of a solid state electrolyte and a solid state cathode with a supporting substrate in a flat or planar arrangement.
Figure 5:
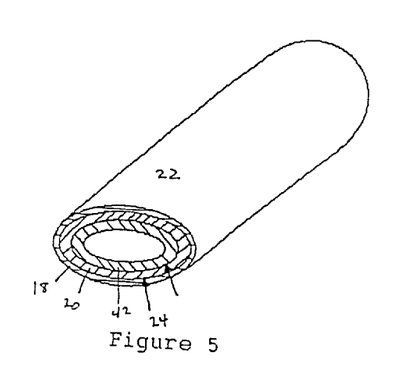
FIG. 5 shows a top, front perspective view of an embodiment of a solid state electrolyte and a solid state cathode with a supporting substrate in a tubular arrangement.

Referring to FIGS. 4 and 5, the solid state cathode may be positioned against a substrate 42 which functions to enhance cathode strength and prevent peeling of the cathode. The substrate 42 is in contact with the cathode at a surface 44 opposite the second contact surface area 24, as shown in a FIGS. 4 and 5. The substrate is porous to oxygen, stable at operating temperatures of at least 400° C. and can be selected from the group consisting of $Al_2O_3$, $TiO_2$, $ZrO_2$, zirconia stabilized by CaO and zirconia stabilized by $Y_2O_3$.

Cathodic section 14 may also includes an oxygen-containing gas flow pipe for directing an oxygen-containing gas flow toward the cathode 20. In FIG. 1, the oxygen-containing gas flow comprises a gas pipe 38 and a source of oxygen gas. Oxygen can also be supplied to the cathode simply by operating the fuel cell in the air, which has an oxygen content of 23%. Air can also be directed towards the cathode at a flow rate of from 0 mL/min per Watt to about 472 mL/min per Watt. The air pressure can range from about 0.1 atmospheres (atm) to about 1000 atm. Fuel cell efficiency can be increased as the oxygen content increases. The oxygen-containing gas flow can have an oxygen content of between about 0.1% to about 100%. A metal wire lead 36 may be connected to the cathode 20.

The electrolyte 18 interfaces anode 16 and cathode 20. In FIG. 1, the electrolyte 18 is a solid state electrolyte which may be selected from the group consisting of a metal oxide and a plurality of metal oxides. The solid state electrolytes used are preferably ceramic materials and have a formula $(ZrO_2)(HfO_2)_a(TiO_2)_b(Al_2O_3)_c(Y_2O_3)_d(M_xO_y)_e$ where a is from 0 to about 0.2, b is from 0 to about 0.5, c is from 0 to about 0.5, d is from 0 to about 0.5, and e is from 0 to 0.15. M is selected from a group of divalent or trivalent metals consisting of manganese, iron, cobalt, nickel, copper and zinc. An appropriate number of oxygen anions are required to counteract the positive charge on the metal ions to give a neutrally-charged $M_xO_y$ species. When e is greater than 0, x and y are integers greater than zero in which is less than or equal to 2 and y is less than or equal to 3. One example of an electrolyte is $ZrO_2$, in which all of a, b, c, d and e equal zero. Other examples electrolytes include $(ZrO_2)(Y_2O_3)_{0.08}$, $(ZrO_2)(HfO_2)_{0.02}(Y_2O_3)_{0.08}$, $(ZrO_2)(HfO_2)_{0.02}(Y_2O_3)_{0.05}$, $(ZrO_2)(HfO_2)_{0.02}(Y_2O_3)_{0.08}(TiO_2)_{0.10}$, $(ZrO_2)(HfO_2)_{0.02}(Y_2O_3)_{0.08}(Al_2O_3)_{0.10}$, $(ZrO_2)(Y_2O_3)_{0.08}(Fe_2O_3)_{0.05}$, $(ZrO_2)(Y_2O_3)_{0.08}(ZnO)_{0.05}$, $(ZrO_2)(Y_2O_3)_{0.08}(CoO)_{0.05}$, $(ZrO_2)(Y_2O_3)_{0.08}(NiO)_{0.05}$, $(ZrO_2)(Y_2O_3)_{0.08}(CuO)_{0.05}$, and $(ZrO_2)(Y_2O_3)_{0.08}(MnO)_{0.05}$. The electrolyte may also be a blend of $(ZrO_2)(HfO_2)_a(TiO_2)_b(Al_2O_3)_c(Y_2O_3)_d(M_xO_y)_e$ combined with a binder containing a maximum of 80% organic reagents such as water, polyols, polyesters and polysaccharides. All the metal oxide materials that make up the electrolyte are preferably subjected to a sintering step at temperatures of at least 1000° C.

The electrolyte may be a molten electrolyte, preferably having a melting temperature of between about 300° C. and about 2000° C. The electrolyte may be selected from the group consisting of metal carbonate, metal oxide, a plurality of metal carbonates, a plurality of metal oxides and mixtures thereof. Examples of molten electrolytes include lithium carbonate, sodium carbonate, potassium carbonate, strontium carbonate, barium carbonate, magnesium carbonate, calcium carbonate, beryllium carbonate, cesium carbonate, rubidium carbonate, $PbCl_2 \cdot 2PbO$, $PbO$, $Bi_2O_3$, $Bi_2O_5$, molybdenum oxide, $Cs_2O$, $Cs_2O_3$, $Sb_2O_3$, $Sb_2O_4$, $Sb_2O_5$, $CuG$, $CuO_2$, $GeO_2$, $GeO$, lithium oxide, palladium oxide, $K_2O$, $KO_2$, $NaO_2$, $Na_2O_2$, $RbO_2$, $Rb_2O_3$, $Rb_2O_2$, $SnO$, $SnO_2$, tellurium oxide, $Tl_2O$, $Tl_2O_3$, vanadium oxide, $As_4O_6$, $As_2O_5$, $In_2O$, $In_2O_3$, and mixtures thereof.

Figure 6:
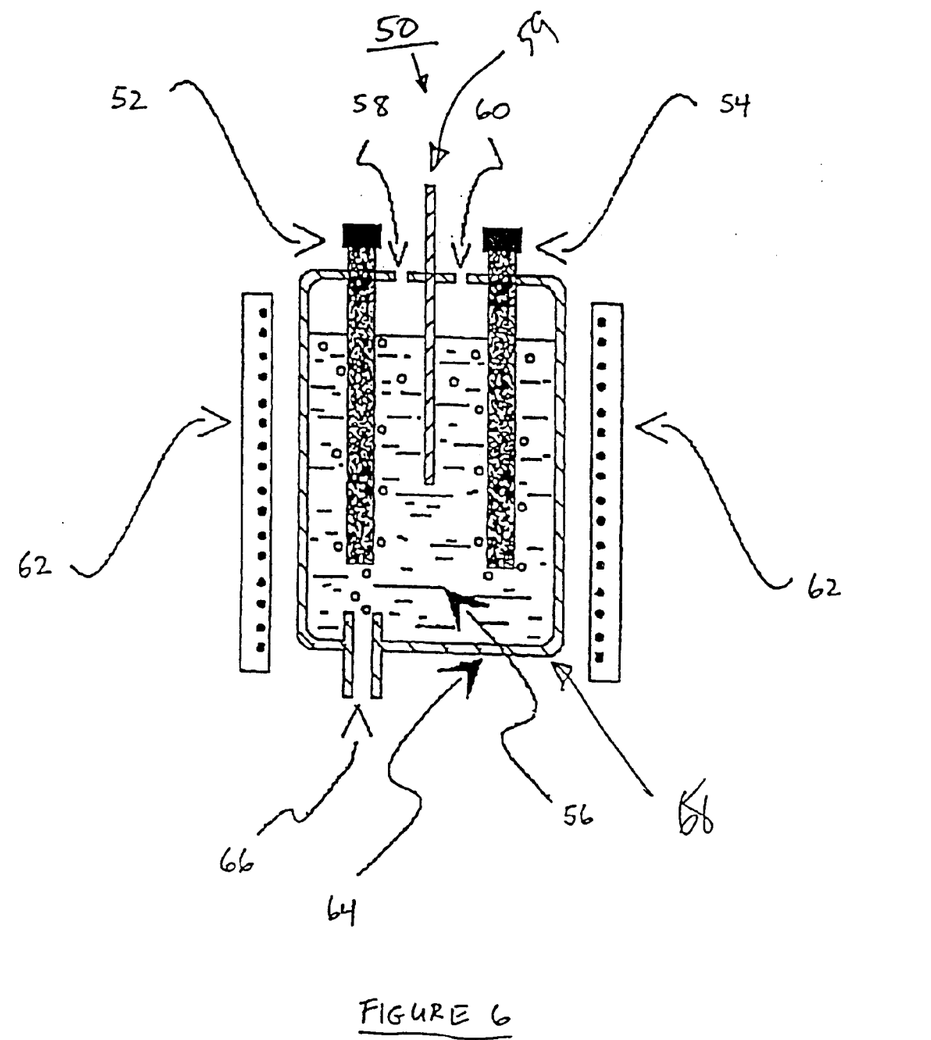
FIG. 6 shows a semidiagramatic, cross-sectional view of an embodiment of a fuel cell having a molten electrolyte.

FIG. 6 shows a semidiagramatic, cross-sectional view of an embodiment of a fuel cell 50 having a molten electrolyte 56, a solid state cathode 52 and a carbon-containing anode 54. The electrolyte 56 is contained within a ceramic housing 68. Cathode 52 and anode 54 are partially immersed in electrolyte 56. FIG. 6 shows a solid anode 54. The anode 54 may also be in particulate form that would be positioned within a casing before immersion into electrolyte 56. The casing is constructed such that molten electrolyte can enter the casing to contact the particulate anode material while preventing the flow of particulate material out into the molten electrolyte. Preferably an oxygen-containing gas flow is bubbled into the electrolyte from inlet 66. Inlet 66 is situated to be in the closest possible proximity to cathode 52 to minimize a distance for oxygen to reach cathode 52. Oxidant gases may exit the fuel cell at outlets 58 and 60. Outlets 58 and 60 are preferably situated at an end of the ceramic housing 68 opposite inlet 66 to allow oxygen to flow throughout the length of the cathode 52 and maximize the use of the cathode surface. A separator 59 allows most of the oxidant gases to exit through outlet 58 to prevent contacting anode 54, causing oxidation of anode 54. Exhaustive gases such as carbon dioxide and carbon monoxide can also exit through outlets 58 and 60. With separator 59, most of the exhaustive gases exit through outlet 60. FIG. 6 also shows a heater 62 surrounding the ceramic housing 68 to heat the fuel cell 50 to operating temperatures of at least 400° C. The heater may also partially surround the ceramic housing 68 or heat a surface or a portion of a surface of the ceramic housing 68. The heater may be an external electric heater. The heater can also comprise burning the carbon monoxide exhaust gas or heating carbon anode 54 itself.

Another aspect of the present invention provides a method for generating electricity in a fuel cell 10. The method comprises the steps of providing a carbon-containing anode 16, an electrolyte he 18 in contact with the carbon-containing anode 16 at a first contact surface area 22 and a solid state cathode 20 in contact with the electrolyte 18 at a second contact surface area 24, as exemplified in FIG. 1. Oxygen is directed towards the cathode and the fuel cell 10 is heated to temperatures between about 400° C. and about 2000° C. to cause electricity to be generated.

The method includes a step of directing an oxygen-containing gas flow towards the cathode. The oxygen-containing gas flow provides oxygen to the cathode where oxygen is ionized to oxygen ions, according to the electrochemical half reaction shown in eq. 1:

$$\tfrac{1}{2}O_2 + 2e^- \rightarrow O^{2-} \tag{1}$$

Preferably, the cathode ionizes oxygen, $O_2$ to oxygen anions, $O^{2-}$. Preferably, the cathode has an oxygen ionization rate of between about $10^{-8}$ g·s$^{-1}$·cm$^{-2}$ and about $10^{-3}$ g·s$^{-2}$·cm$^{-2}$. More preferably, the oxygen ionization rate is between about $5 \times 10^{-6}$ g·s$^{-1}$·cm$^{-2}$ and about $10^{-4}$ g·s$^{-1}$·cm$^{-2}$. Oxygen anions can be released from the cathode to the electrolyte which interfaces the cathode. The electrolyte preferably allows the conduction of ions between the cathode and anode, such as the passage of oxygen anions to the anode. In FIG. 1 the electrolyte 18 is a solid state electrolyte. The solid state electrolyte can be selected from the group consisting of a metal oxide and a plurality of metal oxides. It is known that ions can move through a metal oxide by several mechanisms. For example, the metal ions and oxygen ions of a metal oxide can be roughly viewed as spheres that are packed in a regular array, leaving intrinsic channels and tunnels that provide passageways for ions. Moreover, metal oxides are not perfect solids in that they contain defects or holes. An ion can move from one site to a hole, leaving another hole in its wake that can be potentially occupied by another ion. Zirconia ($ZrO_2$), hafnia ($HfO_2$), yttrium-stabilized zirconia-and yttrium-stabilized hafnia are commonly known as effective oxygen anion conducting materials. Moreover, substituting tetravalent zirconium ions, $Zr^{4+}$, in the crystal lattice with metal ions having valence numbers of less than four reduces a required number of oxygen anions in the lattice to achieve charge neutrality. Consequently, such doped materials have extra oxygen anion vacancies in the crystal lattice.

Fuel cell efficiency increases when ions travel a smaller distance through the solid state electrolyte. The fuel cell efficiency is optimized as a distance between the first contact surface area and the second contact area is minimized. The electrolyte is a substantially planar material and a distance from the first contact area to the second contact area is between about 1 μm to about 1000 μm, preferably between about 1 μm to about 600 μm and more preferably between about 1 μm to about 100 μm.

Ionic mobility in a solid is relatively low compared to ionic mobility in a molten state medium. Preferably, the electrolyte is a molten state electrolyte in which the electrolyte has a melting point of between about 300° C. and about 200° C.

The method also comprises using carbon as a fuel source, wherein the carbon fuel source also acts as an anode and undergoes a first electrochemical half reaction as shown in eq. 2 when allowed to react with a sufficient amount of oxygen anions:

$$C \rightarrow C^{4+} + 4e^- \tag{2}$$

Alternatively, carbon can undergo a second electrochemical half reaction as shown in eq. 3:

$$C \rightarrow C^{2+} + 2e^- \tag{3}$$

The reaction of eq. 3 occurs when a small amount of oxygen anions is present, the small amount being less than the sufficient amount of oxygen required in eq. 2. The anode can be in solid form or in particulate form. When the anode is in particulate form, a mechanical device may be provided to urge the anode against the electrolyte to increase the second contact surface area. The mechanical device may be a spring. It is known that fuel cell power output increases as the second contact surface area increases.

The method includes the step of heating the fuel cell to temperatures between about 400° C. and about 2000° C., preferably between about 700° C. and about 1200° C. There exists a high activation energy barrier in a reaction between carbon with oxygen anions to yield products such as carbon monoxide or carbon dioxide. The energy to overcome the activation energy barrier may be supplied as heat energy. FIG. 1 shows a heater 40 surrounding the anodic casing 26 and cathodic casing 28. The heater 40 may also surround a portion of both the anodic casing 26 and cathodic casing 28 that includes anode 16, electrolyte 18 and cathode 20, or the heater 40 may contact a portion of a surface of anodic casing 26 and cathodic casing 28 that includes anode 16, electrolyte 18 and cathode 20. The heater may be an external electric heater. The heater can also comprise burning the carbon monoxide exhaust gas or heating the carbon anode 20 itself. The heater is capable of heating the fuel cell to a temperature of between about 400° C. and about 2000° C. Preferably the heater heats the fuel cell at a temperature of between about 700° C. and about 1200° C.

In FIG. 1, metal wire leads 34 and 36 are provided. Metal wire lead 36 is directly connected to the cathode 20 and metal wire lead 34 is connected to the spring 32 which has a surface 35 to contact the anode 16. Preferably, the spring 32 has a resistivity which is at least equal to that of the anode 16. When the anode is a solid, the spring 32 may be connected directly to the anode. The metal wire leads 34 and 36 may be selected from the group consisting of platinum, copper, silver, stainless steel and a metal oxide which has a resistivity at least equal to that of the anode. When one end of each metal wire lead is connected to the anode or cathode, the other end may be connected to a load. At a temperature of at least 400° C., the fuel cell 10 provides an electrical output of at least 1 mW·cm$^{-2}$ of the second contact surface area, preferably of from about 1 mW·cm$^{-2}$ to about 5000 mW·cm$^{-2}$ of the second contact surface area and more preferably of from about 10 mW·cm$^{-2}$ to about 5000 mW·cm$^{-2}$ of the second contact surface area.

The function and advantage of these and other embodiments of the present invention will be more fully understood from the examples below. The following examples are intended to illustrate the benefits of the present invention, but do not exemplify the full scope of the invention.

Example 1: A $La_{0.84}Sr_{0.16}MnO_3$ Cathode

A cathode material as shown in FIG. 1 is prepared with a spray dryer. All chemical reagents are purchased from Alfa Aesar, Ward Hill, Mass. Lanthanum nitrate (hexahydrate, 26.0 g) strontium nitrate (3.4 g) and manganese acetate (tetrahydrate, 24.5 g) are dissolved in 150 mL of water to give a molar ratio of 0.84:0.16:1 for La:Sr:Mn. The solution is sprayed into a hot chamber to vaporize the volatile components. The residual is then sintered at 1000° C. for one hour to achieve fine uniform particles having a particle size of 0.01–2 microns. The cathode material is combined with a binder, starch, and pressed into a disk having a diameter of 12.5 mm.

Example 2: A $La_{0.84}Sr_{0.16}MnO_3$ Cathode/$(ZrO_2)(HfO_2)_{0.02}(Y_xO_3)_{0.08}$ Electrolyte Cell A 12.5 mm diameter and 600 μm thick planar cathode disk of $La_{0.84}Sr_{0.16}MnO_3$ as prepared in Example 1 is painted, with a thin layer of slurry containing $(ZrO_2)(HfO_2)_{0.02}(Y_2O_3)_{0.08}$ (1.0 g), glycerin (0.5 g) and starch (0.2 g) in 5 mL water and sintered at 1100° C. to form a dense electrolyte having a thickness of 100 μm.

Example 3: Cathode Materials from $La_{0.84}Sr_{0.16}MnO_3/(ZrO_2(HfO_2)_{0.02}(Y_2O_3)_{0.08}$ blends $La_{0.84}Sr_{0.16}MnO_3$ (1.0 g) is combined with $(ZrO_2)(HfO_2)_{0.02}(Y_2O_3)_{0.08}$ (0.1 g) and ground with a mortar and pestle. An amount of 0.18 g of the ground material is used to make a 12.5 mm and 600 μm disk by pressing. The disk is sprayed with $(ZrO_2)(HfO_2)_{0.02}(Y_2O_3)_{0.08}$ powder (0.05 g), pressed again and sintered at 1100° C. for 1 h to form a 120 μm thick planar electrolyte. Similar blends can be prepared by combining $La_{0.84}Sr_{0.16}MnO_3$ (1.0g) with $(ZrO_2)(HfO_2)_{0.02}(Y_2O_3)_{0.08}$ (0.2 g), $La_{0.84}Sr_{0.16}MnO_3$ (1.0g) with $(ZrO_2)(HfO_2)_{0.02}(Y_2O_3)_{0.08}$ (0.5 g), and $La_{0.84}Sr_{0.16}MnO_3$ (1.0 g) with $(ZrO_2)(HfO_2)_{0.02}(Y_2O_3)_{0.08}$ (1.0 g).

Example 4: A $La_{0.84}Sr_{0.16}M_nO_3$ Cathode/$(ZrO_2)(HfO_2)_{0.02}Y_2O_3)_{0.08}$ Electrolyte Cell with Substrate CaO stabilized zirconia (1.0g, 4 wt %), purchased from Alfa Aesar, Ward Hill, Mass., is combined with polysaccharide (0.2 g) and ground with a mortar and pestle to form a blend. The blend (0.3 g) is molded and pressed into a 12.5 mm disc. The substrate disc is sprayed with a thin layer of the cathode material from Example 1 (0.05 g), pressed again, fired and sintered at 1000° C. for one hour. The disc is cooled down and painted with the electrolyte material of Example 2 to give a film thickness of 125 μm and fired and sintered at 1100° C. for 1 h.

Example 5: A Solid State Electrolyte Fuel Cell-1

A 12 mm diameter fuel cell disk from Example 3 consisting of a 200 μm thick 1 $La_{0.84}Sr_{0.16}MnO_3/(ZrO_2)(HfO_2)_{0.02}(Y_2O_3)_{0.08}$ cathode blend and a 600 μm thick $(ZrO_2)(HfO_2)_{0.02}(Y_2O_3)_{0.08}$ electrolyte is used as a cathode/electrolyte cell in the structure of FIG. 1. Carbon black, obtained as Black Pearl from Cabot Corp., Boston, Mass. is used as the anode in an amount of 1.0 g. Platinum wires are connected to the anode and cathode and attached to a multimeter. Nitrogen gas is used to blanket the carbon anode at a flow rate of 2 mL/min. Air is supplied to the cathode at a rate of 10 mL/min. The solid state cathode, electrolyte and anode combination is mounted in a structure as shown in FIG. 1 where the casings 26 and 28 have an inner diameter of 8 mm. The fuel cell is heated to 1000° C. to generate an electric current of 10 mW·cm$^{-2}$ power output with a voltage of 0.362 V.

Example 6: A Solid State Electrolyte Fuel Cell-2

A 12 mm diameter fuel cell disk from Example 3 consisting of a 200 μm thick 1:0.25 $La_{0.84}Sr_{0.16}MnO_3/(ZrO_2)(HfO_2)_{0.02}(Y_2O_3)_{0.08}$ cathode blend and a 600 μm thick $(ZrO_2)(HfO_2)_{0.02}(Y_2O_3)_{0.08}$ electrolyte is used as a cathode/electrolyte cell in the structure of FIG. 1 where the casings 26 and 28 have an inner diameter of 8 mm. Graphite (1.0 g) obtained as TIMREX KS 5-75TT from Timcal America Inc., Ohio, is used as the anode. Platinum wires are connected to the anode and cathode and attached to a multimeter. Nitrogen gas is used to blanket the carbon anode at a flow rate of 2 mL/min. Oxygen is supplied to the cathode by direct exposure to air. The fuel cell is heated to 800° C. to generate an electric current of 2.5 mW·cm$^{-2}$ power output with a voltage of 0.362 V. At 1019° C., the fuel cell generates an electric current of 12 mW·cm$^{-2}$ power output with a voltage of 0.44 V.

Example 7: A Solid State Electrolyte Fuel Cell-3

An 11.5 mm fuel cell disk from Example 3 consisting of a 600 μm thick $La_{0.84}Sr_{0.16}MnO_3$ cathode and a 120 μm thick $(ZrO_2)(HfO_2)_{0.02}(Y_2O_3)_{0.08}$ electrolyte is used as a cathode/electrolyte cell in the structure of FIG. 1 where the casings 26 and 28 have an inner diameter of 8 mm. Carbon black, obtained as Black Pearl from Cabot Corp., Boston, Mass. is used as the anode in an amount of 1.0 g. Platinum wires are connected to the anode and cathode and attached to a multimeter. No inert gas is supplied to the anode. Oxygen is supplied to the cathode by direct exposure to air. The fuel cell is heated to 800° C. to generate an electric current of 10 mW·cm$^{-2}$ power output with a voltage of 0.248 V. At 1002° C., the fuel cell generates an electric current of 50 mW·cm$^{-2}$ power output with a voltage of 0.507 V.

Example 8: A Molten State Electrolyte Fuel Cell-1

Referring to FIG. 6, the fuel cell has a Pt foil cathode activated with Pt black and an electrically conductive carbon rod anode. The anode is prepared by combining carbon powder with a polysaccharide (starch) binder. Carbon black (80 wt %), obtained as Black Pearl from Cabot Corp., Boston, Mass. and starch (20 wt %) are combined and ground with a mortar and pestle and pressed into a rod of 1 cm diameter having a length of 10 cm. The carbon rod is heated to 1000° C. at a rate of 100° C./h under a nitrogen atmosphere. The electrolyte is lithium carbonate purchased from Aldrich, Wis. The components are stored in a ceramic cell housing. The cell housing is placed in a controlled heating block and heated up to 900° C. A 70:30 v:v oxygen/carbon dioxide gas flow is bubbled at a rate of 10 mL/min through an inlet under the cathode.

Example 9: A Molten State Electrolyte Fuel Cell-2

The fuel cell has an arrangement as described in Example 8 using a NiO cathode prepared by combining NiO powder with lithium oxide in a 1:0.05 ratio, both NiO and lithium oxide purchased from Aldrich, Milwaukee, Wis. A starch binder (20 wt %) is added and the mixture is pressed into a rod having a length of 10 cm and a diameter of 1 cm. The tube is placed in a furnace and heated to 1100° C. at rate of 100° C./h in air. The anode is prepared by heating smokeless coal to 1000° C. under an inert atmosphere to form coke. The coke is crashed and ground into a powder. Coke (80 wt %) and starch (20 wt %) are ground with a mortar and pestle and pressed into a 10 cm long rod having a diameter of 1 cm. The carbon anode is heated to 1000° C. The electrolyte is lithium carbonate containing 5 wt % strontium carbonate stored in a ceramic cell housing up to 900° C. a 80:20 v:v air/carbon dioxide gas flow is bubbled at a rate of 10 mL/min through an inlet under the cathode.

Example 10: a Molten State Electrolyte Fuel Cell-3

The fuel cell has an arrangement as described in Example 8 using a $Bi_2O_3$ electrolyte purchased from Aldrich, Milwaukee, Wis. The fuel cell has a platinum foil cathode activated with platinum black and an electrically conductive carbon rod anode. Carbon black (80 wt %) obtained as Black Pearl from Cabot Corp., Boston, Mass. and starch (20 wt %) are ground with a mortar and pestle, molded and pressed into a 10 cm long rod having a diameter of 1 cm. The carbon rod is heated to 1000° C. at a rate of 100° C./h under a nitrogen atmosphere. The components are stored in a ceramic cell housing. The cell housing is placed in a controlled heating block and heated up to 1100° C. An air flow is bubbled at a rate of 10 mL/min through an inlet under the cathode.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described. For example, the anode, cathode and solid electrolyte can be in various regular or irregular geometric shapes such as cylinders, rectangles, five, six, seven, eight or more-sided shapes, planar or curved layers and others.

What is claimed is:

1. An electricity producing fuel cell comprising:
   a carbon-containing anode:
   an electrolyte having a melting temperature of between about 300° C. and about 2000° C. in contact with said anode at a first contact surface area, allowing passage of oxygen anions to said anode: and
   a solid state cathode in contact with said electrolyte at a second contact surface area, for ionizing oxygen to the oxygen anions, said fuel cell being operable at a temperature of between about 700° C. and about 1200° C.

2. The fuel cell as in claim 1, wherein said anode is selected from the group consisting of graphite, quasi-graphite, coal, coke, charcoal, fullerene, buckminsterfullerene, carbon black, activated carbon, decolorizing carbon and mixtures thereof.

3. The fuel cell as in claim 1, wherein said anode is selected from the group consisting of a solid material and a particulate material.

4. The fuel cell as in claim 1, wherein said electrolyte is selected from the group consisting of metal carbonate, metal oxide, a plurality of metal carbonates, a plurality of metal oxides and mixtures thereof.

5. The fuel cell as in claim 4, wherein said electrolyte is selected from the group consisting of lithium carbonate, sodium carbonate, potassium carbonate, strontium carbonate, barium carbonate, magnesium carbonate, calcium carbonate, beryllium carbonate, cesium carbonate, rubidium carbonate, $PbCl_2 \cdot 2PbO$, PbO, $Bi_2O_3$, $Bi_2O_5$, molybdenum oxide, $Cs_2O$, $Cs_2O_3$, $Sb_2O_3$, $Sb_2O_4$, $Sb_2O_5$, CuO, $CuO_2$, $GeO_2$, GeO, lithium oxide, palladium oxide, $K_2O$, $KO_2$, $NaO_2$, $Na_2O_2$, $RbO_2$, $Rb_2O_3$, $Rb_2O_2$, SnO, $SnO_2$, tellurium oxide, $Tl_2O$, $Tl_2O_3$, vanadium oxide, $As_4O_6$, $As_2O_5$, $In_2O$, $In_2O_3$, and mixtures thereof.

6. The fuel cell as in claim 1, wherein said solid state cathode has an oxygen ionization rate of between about $10^{-8}$ g·s$^{-1}$·cm$^{-2}$ and about $10^{-3}$ g·s$^{-1}$ cm$^{-2}$.

7. The fuel cell as in claim 1, wherein said solid state cathode has an oxygen ionization rate of between about $5 \times 10^{-6}$ g·s$^{-1}$·cm$^{-2}$ and about $10^{-4}$ g·s$^{-1}$·cm$^{-2}$.

8. The fuel cell as in claim 1, wherein said solid state cathode has an electrical resistivity of between about $10^{-9}$ ohm-cm and about 100 ohm-cm.

9. The fuel cell as in claim 2, wherein said solid state cathode is selected from the group consisting of a metal, a metal oxide, a plurality of metal oxides and mixtures thereof.

10. The fuel cell as in claim 9, wherein said solid state cathode is selected from the group consisting of platinum, palladium, gold, silver, stainless steel, copper, nickel, cobalt, titanium, vanadium, chromium, iron and zirconium.

11. The fuel cell as in claim 9, wherein said solid state cathode has a formula $La_xMn_yA_aB_bC_cO_d$ where A is an alkaline earth metal, B is selected from the group consisting of scandium, yttrium and a lanthanide metal, C is selected from the group consisting of titanium, vanadium, chromium, iron, cobalt, nickel, copper, zinc, zirconium, hafnium, aluminum and antimony, x is from 0 to about 1.05, y is from 0 to about 1, a is from 0 to about 0.5, b is from 0 to about 0.5, c is from 0 to about 0.5 and d is between about 1 and about 5, and at least one of x, y, a, b and c is greater than zero.

12. The fuel cell as in claim 11, wherein said solid state cathode is a physical mixture of $La_xMn_yA_aB_bC_cO_d$ and $(ZrO_2)(HfO_2)_e(Y_2O_3)_f$ at a ratio from 1:0 to about 1:2 where e is from 0 to about 0.2 and f is from 0 to about 0.5.

13. The fuel cell as in claim 12, wherein said physical mixture further comprises a binding reagent selected from the group consisting of water, polyols, polyesters and polysaccharides.

14. The fuel cell as in claim 9, wherein said solid state cathode has a formula $Li_xM_{1-x}O$ where M is a metal selected from the group consisting of nickel and cobalt and x is from 0 to about 0.25.

15. The fuel cell as in claim 9, wherein said solid state cathode is $Cr_2O_3$.

16. The fuel cell as in claim 1, wherein said solid state cathode is selected from the group consisting of $LaMnO_3$, $La_{0.84}Sr_{0.16}MnO_3$, $La_{0.84}Ca_{0.16}MnO_3$, $La_{0.84}Ba_{0.16}MnO_3$, $La_{0.65}Sr_{0.35}Mn_{0.8}Co_{0.2}O_3$, $La_{0.79}Sr_{0.16}Mn_{0.85}Co_{0.15}O_3$, $La_{0.84}Sr_{0.16}Mn_{0.8}Ni_{0.2}O_3$, $La_{0.84}Sr_{0.16}Mn_{0.8}Fe_{0.2}O_3$, $La_{0.84}Sr_{0.16}Mn_{0.8}Ce_{0.2}O_3$, $La_{0.84}Sr_{0.16}Mn_{0.8}Mg_{0.2}O_3$, $La_{0.84}Sr_{0.16}Mn_{0.8}Cr_{0.2}O_3$, $La_{0.6}Sr_{0.35}Mn_{0.8}Al_{0.2}O_3$, $La_{0.84}Sc_{0.16}MnO_3$, and $La_{0.84}Y_{0.16}MnO_3$.

17. The fuel cell as in claim 1, wherein said solid state cathode has a thickness of at least 1 µm.

18. The fuel cell as in claim 1, further comprising a substrate in contact with said solid state cathode at a surface other than said second contact surface area, for providing support to said cathode.

19. The fuel cell as in claim 18, wherein said substrate is selected from the group consisting of $Al_2O_3$, $TiO_2$, $ZrO_2$, zirconia stabilized by CaO and zirconia stabilized by $Y_2O_3$.

20. The fuel cell as in claim 1, further comprising an inert gas to isolate said anode from a surrounding environment.

21. The fuel cell as in claim 1, further comprising a source for directing an oxygen-containing gas flow to said solid state cathode.

22. The fuel cell as in claim 1, further comprising a mechanical device in operative relationship to said anode and acting to increase said first contact surface area.

23. The fuel cell as in claim 1, further comprising a heater positioned to heat said fuel cell to a temperature of between about 400° C. and 2000° C.

24. An electricity producing fuel cell comprising:
a carbon-containing anode;
an electrolyte having a melting temperature of between about 300° C. and about 2000° C. in contact with said anode at a first contact surface area, allowing passage of oxygen anions to said anode; and
a solid state cathode in contact with said electrolyte at a second contact surface area, for ionizing oxygen to the oxygen anions, said fuel cell being operable at a temperature of between about 400° C. and about 2000° C.,
said fuel cell having an electrical output of at least 1 mW·cm$^{-2}$ of said second contact surface area.

25. The fuel cell as in claim 24, wherein said fuel cell has an electrical output of from about 1 mW·cm$^{-2}$ to about 5000 mW·cm$^{-2}$ of said second contact surface area.

26. The fuel cell as in claim 24, wherein said fuel cell has an electrical output of from about 10 mW·cm$^{-2}$ to about 5000 mW·cm$^{-2}$ of said second contact surface area.

27. The fuel cell as in claim 24, wherein said electrolyte is selected from the group consisting of metal carbonate, metal oxide, a plurality of metal carbonates, a plurality of metal oxides and mixtures thereof.

28. The fuel cell as in claim 24, wherein said solid state cathode has an oxygen ionization rate of between about $10^{-8}$ g·s$^{-1}$·cm$^{-2}$ and about $10^{-3}$ g·s$^{-1}$·cm$^{-2}$.

29. The fuel cell as in claim 24, wherein said solid state cathode has an electrical resistivity of between about $10^9$ ohm-cm and about 100 ohm-cm.

30. The fuel cell as in claim 24, wherein said solid state cathode is selected from the group consisting of a metal, a metal oxide, a plurality of metal oxides and mixtures thereof.

31. The fuel cell as in claim 24, wherein said solid state cathode has a thickness of at least 1 µm.

32. The fuel cell as in claim 24, further comprising a substrate in contact with said solid state cathode at a surface other than said second contact surface area, for providing support to said cathode.

33. The fuel cell as in claim 24, further comprising an inert gas to isolate said anode from a surrounding environment.

34. The fuel cell as in claim 24, further comprising a source for directing an oxygen-containing gas flow to said solid state cathode.

35. The fuel cell as in claim 24, further comprising a mechanical device in operative relationship to said anode and acting to increase said first contact surface area.

36. An electricity producing fuel cell comprising:
a carbon-containing anode comprising conductive carbon having a resistivity of between about $10^{-5}$ ohm-cm and about 100 ohm-cm;
an electrolyte having a melting temperature of between about 300° C. and about 2000° C. in contact with said anode at a first contact surface area, allowing passage of oxygen anions to said anode; and
a solid state cathode in contact with said electrolyte at a second contact surface area, for ionizing oxygen to the oxygen anions, said fuel cell being operable at a temperature of between about 400° C. and about 2000° C.

37. The fuel cell as in claim 36, wherein said anode comprises conductive carbon having a resistivity of between about $10^{-3}$ ohm-cm and about $10^{-1}$ ohm-cm.

38. The fuel cell as in claim 36, wherein said electrolyte is selected from the group consisting of metal carbonate, metal oxide, a plurality of metal carbonates, a plurality of metal oxides and mixtures thereof.

39. The fuel cell as in claim 36, wherein said solid state cathode has an oxygen ionization rate of between about $10^{-8}$ g·s$^{-1}$·cm$^{-2}$ and about $10^{-3}$ g·s$^{-1}$·cm$^{-2}$.

40. The fuel cell as in claim 36, wherein said solid state cathode has an electrical resistivity of between about $10^{-9}$ ohm-cm and about 100 ohm-cm.

41. The fuel cell as in claim 36, wherein said solid state cathode is selected from the group consisting of a metal, a metal oxide, a plurality of metal oxides and mixtures thereof.

42. The fuel cell as in claim 36, wherein said solid state cathode has a thickness of at least 1 µm.

43. The fuel cell as in claim 36, further comprising a substrate in contact with said solid state cathode at a surface other than said second contact surface area, for providing support to said cathode.

44. The fuel cell as in claim 36, further comprising an inert gas to isolate said anode from a surrounding environment.

45. The fuel cell as in claim 36, further comprising a source for directing an oxygen-containing gas flow to said solid state cathode.

46. The fuel cell as in claim 36, further comprising a mechanical device in operative relationship to said anode and acting to increase said first contact surface area.

47. An electricity producing fuel cell comprising:
a carbon-containing anode:
a solid state electrolyte having a melting temperature of between about 300° C. and about 2000° C. in contact with said anode at a first contact surface area, allowing passage of oxygen anions to said anode;
a solid state cathode in contact with said electrolyte at a second contact surface area, for ionizing oxygen to the oxygen anions, said fuel cell being operable at a temperature of between about 400° C. and about 2000° C.;
said electrolyte defining a distance therethrough from said first contact surface area to said second contact surface area of between about 1 $\mu$m to 1000 $\mu$m.

48. The fuel cell as in claim 47, wherein said electrolyte defines a distance therethru from said first contact surface area to said second contact surface area of between about 1 $\mu$m to 600 $\mu$m.

49. The fuel cell as in claim 47, wherein said electrolyte defines a distance therethru from said first contact surface area to said second contact surface area of between about 1 $\mu$m to 100 $\mu$m.

50. The fuel cell as in claim 47, wherein said electrolyte is selected from the group consisting of metal carbonate, metal oxide, a plurality of metal carbonates, a plurality of metal oxides and mixtures thereof.

51. The fuel cell as in claim 47, wherein said solid state cathode has an oxygen ionization rate of between about $10^{-8}$ g·s$^{-1}$·cm$^{-2}$ and about $10^{-3}$ g·s$^{-1}$·cm$^{-2}$.

52. The fuel cell as in claim 47, wherein said solid state cathode has an electrical resistivity of between about $10^{-9}$ ohm-cm and about 100 ohm-cm.

53. The fuel cell as in claim 47, wherein said solid state cathode is selected from the group consisting of a metal, a metal oxide, a plurality of metal oxides and mixtures thereof.

54. The fuel cell as in claim 47, wherein said solid state cathode has a thickness of at least 1 $\mu$m.

55. The fuel cell as in claim 47, further comprising a substrate in contact with said solid state cathode at a surface other than said second contact surface area, for providing support to said cathode.

56. The fuel cell as in claim 47, further comprising an inert gas to isolate said anode from a surrounding environment.

57. The fuel cell as in claim 47, further comprising a source for directing an oxygen-containing gas flow to said solid state cathode.

58. The fuel cell as in claim 47, further comprising a mechanical device in operative relationship to said anode and acting to increase said first contact surface area.

59. An electricity producing fuel cell comprising:
a carbon-containing anode:
a solid state electrolyte having a melting temperature of between about 300° C. and about 2000° C. in contact with said anode at a first contact surface area, allowing passage of oxygen anions to said anode, said solid state electrolyte selected from the group consisting of a metal oxide and a plurality of metal oxides; and
a solid state cathode in contact with said electrolyte at a second contact surface area, for ionizing oxygen to the oxygen anions, said fuel cell being operable at a temperature of between about 400° C. and about 2000° C.

60. The fuel cell as in claim 59, wherein said solid state electrolyte has a formula $(ZrO_2)(HfO_2)(TiO_2)(Al_2O_3)(Y_2O_3)(M_xO_y)$ where a is from 0 to about 0.2, b is from 0 to about 0.5, c is from 0 to about 0.5, d is from 0 to about 0.5, x is an integer greater than 0 and less than or equal to 2, y is an integer greater than 0 and less than or equal to 3, e is from 0 to about 0.15, and M is selected from the group consisting of manganese, iron, cobalt, nickel, copper, and zinc.

61. The fuel cell as in claim 60, wherein said solid state electrolyte is selected from the group consisting of $(ZrO_2)$, $(ZrO_2)(Y_2O_3)_{0.08}$, $(ZrO_2)(HfO_2)_{0.02}(Y_2O_3)_{0.08}$, $(ZrO_2)(HfO_2)_{0.02}(Y_2O_3)_{0.05}$, $(ZrO_2)(HfO_2)_{0.02}(Y_2O_3)_{0.08}(TiO_2)_{0.10}$, $(ZrO_2)(HfO_2)_{0.02}(Y_2O_3)_{0.08}(Al_2O_3)_{0.10}$, $(ZrO_2)(Y_2O_3)_{0.08}(Fe_2O_3)_{0.05}$, $(ZrO_2)(Y_2O_3)_{0.08}(CoO)_{0.05}$, $(ZrO_2)(Y_2O_3)_{0.08}(ZnO)_{0.05}$, $(ZrO_2)(Y_2O_3)_{0.08}(NiO)_{0.05}$, $(ZrO_2)(Y_2O_3)_{0.08}(CuO)_{0.05}$, and $(ZrO_2)(Y_2O_3)_{0.08}(MnO)_{0.05}$.

62. The fuel cell as in claim 60, wherein said electrolyte is a blend comprising $(ZrO_2)(HfO_2)_a(TiO_2)_b(Al_2O_3)_c(Y_2O_3)_d(M_xO_y)$ and a maximum of 80% of at least one organic binder selected from the group consisting of water, polyols, polyesters and polysaccharides.

63. The fuel cell as in claim 59, wherein said electrolyte is selected from the group consisting of metal carbonate, metal oxide, a plurality of metal carbonates, a plurality of metal oxides and mixtures thereof.

64. The fuel cell as in claim 59, wherein said solid state cathode has an oxygen ionization rate of between about $10^{-8}$ g·s$^{-1}$ cm and about $10^{-3}$ g·s$^{-1}$·cm$^{-2}$.

65. The fuel cell as in claim 59, wherein said solid state cathode has an electrical resistivity of between about $10^{-9}$ ohm-cm and about 100 ohm-cm.

66. The fuel cell as in claim 59, wherein said solid state cathode is selected from the group consisting of a metal, a metal oxide, a plurality of metal oxides and mixtures thereof.

67. The fuel cell as in claim 59, wherein said solid state cathode has a thickness of at least 1 $\mu$m.

68. The fuel cell as in claim 59, further comprising a substrate in contact with said solid state cathode at a surface other than said second contact surface area, for providing support to said cathode.

69. The fuel cell as in claim 59, further comprising an inert gas to isolate said anode from a surrounding environment.

70. The fuel cell as in claim 59, further comprising a source for directing an oxygen-containing gas flow to said solid state cathode.

71. The fuel cell as in claim 59, further comprising a mechanical device in operative relationship to said anode and acting to increase said first contact surface area.

* * * * *

UNITED STATES PATENT AND TRADEMARK OFFICE
CERTIFICATE OF CORRECTION

PATENT NO. : 6,692,861 B2  Page 1 of 1
DATED : February 17, 2004
INVENTOR(S) : Tao T. Tao It is certified that error appears in the above-identified patent and that said Letters Patent is hereby corrected as shown below:

Column 16,
Line 11, change "$(Y_2O_3)(M_x)O_y)$" to -- $(Y_2O_3)(M_x)O_y)_e$ --.

Signed and Sealed this

Twenty-fifth Day of May, 2004

JON W. DUDAS
*Acting Director of the United States Patent and Trademark Office*